(12) United States Patent
Zilverentant

(10) Patent No.: US 6,602,417 B1
(45) Date of Patent: Aug. 5, 2003

(54) PROCESS FOR THE TREATMENT OF WASTE WATER CONTAINING SPECIFIC COMPONENTS E.G. AMMONIA

(75) Inventor: Arnold Gerrit Zilverentant, Ede (NL)

(73) Assignee: DHV Water B.V., Amersfoort (NL)

( * ) Notice: Subject to any disclaimer, the term of this patent is extended or adjusted under 35 U.S.C. 154(b) by 0 days.

(21) Appl. No.: 09/744,310

(22) PCT Filed: Jul. 19, 1999

(86) PCT No.: PCT/NL99/00462

§ 371 (c)(1),
(2), (4) Date: Mar. 30, 2001

(87) PCT Pub. No.: WO00/05177

PCT Pub. Date: Feb. 3, 2000

(30) Foreign Application Priority Data

Jul. 24, 1998 (EP) ................................. 98202499

(51) Int. Cl.⁷ .................................. C02F 3/12
(52) U.S. Cl. ............... 210/605; 210/624; 210/625; 210/626; 210/903
(58) Field of Search ............... 210/605, 624, 210/625, 626, 630, 903

(56) References Cited

U.S. PATENT DOCUMENTS

| | | | |
|---|---|---|---|
| 3,764,523 A | | 10/1973 | Stankewich, Jr. |
| 5,192,442 A | * | 3/1993 | Piccirillo et al. ........... 210/903 |
| 5,288,405 A | * | 2/1994 | Lamb, III ................. 210/625 |
| 5,290,451 A | * | 3/1994 | Koster et al. .............. 210/624 |
| 5,447,633 A | * | 9/1995 | Matsche et al. ............ 210/605 |
| 5,624,562 A | * | 4/1997 | Scroggins ................. 210/903 |
| 6,163,932 A | | 12/2000 | Rosen |

FOREIGN PATENT DOCUMENTS

| | | |
|---|---|---|
| EP | 0849230 | 6/1998 |
| FR | 2160799 | 7/1973 |
| WO | 98/33745 * | 8/1988 |
| WO | WO 9800370 | 1/1998 |

* cited by examiner

Primary Examiner—Christopher Upton
(74) Attorney, Agent, or Firm—Handal & Morofsky

(57) ABSTRACT

A process is described for the biological treatment of waste water containing a specific component such as ammonia, wherein the waste water together with surplus sludge from an activated sludge reactor is treated in a bioaugmentation reactor, applying a hydraulic retention time in the continuously or discontinuously operated reactor which is shorter than the sludge retention time by retaining part of the sludge in the reactor and continuing the use of the separated part in the reactor. The non-retained part of the sludge, together with the effluent of the bioaugmentation reactor, is added to the activated sludge reactor.

12 Claims, 2 Drawing Sheets

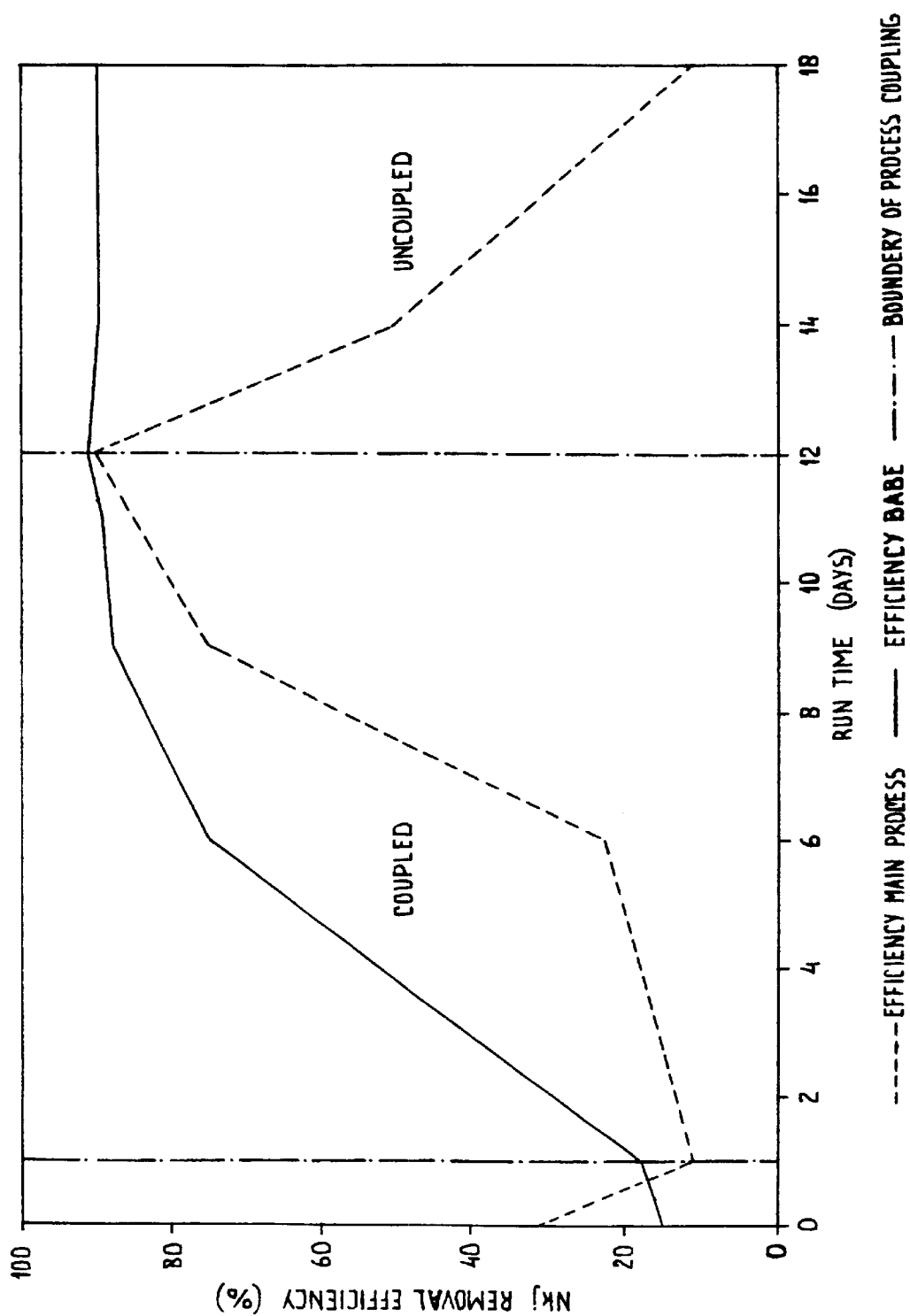

Figure 1:
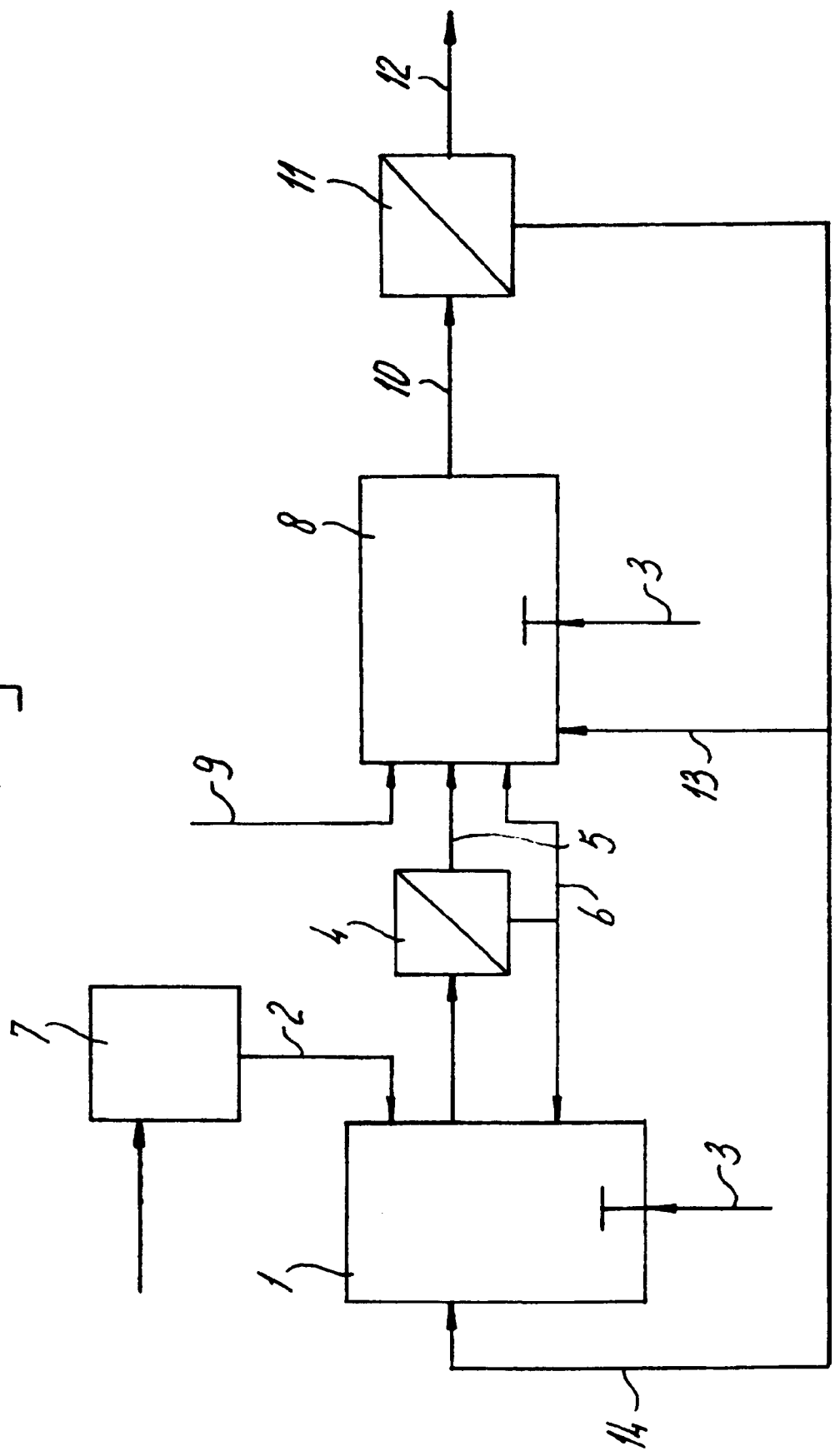

PROCESS FOR THE TREATMENT OF WASTE WATER CONTAINING SPECIFIC COMPONENTS E.G. AMMONIA

The invention relates to a process for the combined biological treatment of waste water containing one or more specific components in a pre-treatment reactor and waste water containing non-specific COD in a main reactor. The specific component can in particular be an organic substance or ammonia.

A process for the treatment of waste water containing ammonia by nitrifying bacteria, wherein ammonia is predominantly oxidised to nitrite, is disclosed in EP-A-826639. According to this known process, the waste water is treated in a continuously stirred tank reactor (CSTR) without sludge retention, with adjustment of the hydraulic retention time at about 1½ days. Under such conditions the bacteria which convert ammonia to nitrite, including e.g. the genus Nitrosomonas, have a sufficient growth rate to compensate for the sludge loss from the reactor, while the bacteria which convert nitrite to nitrate, including e.g. the genus Nitrobacter, do not have a sufficient growth rate to be maintained in the reactor. As a result, conversion of nitrite to nitrate is suppressed, which has the advantages of reduced oxygen consumption and reduced electron donor (COD) demand in a downstream denitrification process. This process is also referred to as Single reactor for High activity Ammonia Removal Over Nitrite (SHARON) process.

A drawback of this known process is that the required hydraulic retention time of 1–2 days necessitates the use of large reactors, which are loaded to a low level only. This is especially disadvantageous in the treatment of relatively diluted waste water.

Another approach is the use of selected microorganisms (EP-A-562466). In this process specific mixtures of micro-organisms (such as Pseudomonas, Acinetobacter, Moraxella, Corynebacterium, Micrococcus, Flavobacterium and Bacillus) are grown in separate reactors (so called propagators) and continuously or discontinuously dosed from these reactors into the waste water treatment plant. Drawbacks of such a process are the laborious (and therefore costly) cultivation of the selected micro-organisms and the relatively ineffective use of the bioreactors.

EP-A-503546 describes a process characterised in that a waste water containing a high concentration of nitrogen (i.e. reject water) is stored in a tank in which subsequently nitrification/denitrification takes place. The produced biomass is continuously or periodically transferred to the waste water treatment plant. The setbacks are comparable to the setbacks of the SHARON process referred to above, i.e. low sludge concentration, relatively large reactor volume and poor settling characteristics.

WO 98/00370 describes a nitrification process for the treatment of ammonia, in which a concentrated ammonia-containing side stream, e.g. reject water of the main stream, is treated in a conventional high loaded unit for producing nitrifiers. The nitrifiers are fed to the main stream in order to enhance the nitrification in the main stream. As in the process of EP-826639, the nitrifiers will be sensitive to preferential grazing by higher organisms in the main process.

A process has been found now which overcomes this drawback. In the process of the invention, surplus sludge from an activated sludge plant is used in a pre-treatment reactor in which higher levels of the specific component(s) are treated than in the activated sludge plant. The reactivated sludge is recycled to the activated sludge process.

In the process of the invention, the hydraulic retention time in the pre-treatment reactor can be shorter than the sludge retention time and the sludge age is controlled. In case of nitrification, the sludge age is preferably shorter than the doubling period of the nitrate-producing bacteria. The desired retention times are effected by settling and separating part of the sludge from the pre-treatment reactor, either together with the treated waste water or separately, and returning part of the sludge to the pre-treatment reactor.

Preferably, the pre-treatment reactor is operated batchwise, and part of the sludge separated from the pre-treatment reactor is fed to the activated sludge plant treating organic waste containing non-specific COD and lower concentrations of the specific component(s). Non-specific COD is understood to comprise regular waste, for example municipal waste, exclusively or predominantly consisting of non-aromatic biodegradable organic material such as alcohols, fatty acids, fats, carbohydrates, proteinaceous material and the like. The configuration of the invention is referred to as a Bio Augmentation Batch Enhanced configuration, and the pre-treatment reactor will be referred to as the BABE reactor or bio-augmentation reactor.

An important feature of the process of the invention is that a limited amount of surplus sludge from the main (activated sludge) process is used in the BABE reactor, allowing the growth of specific micro-organisms and incorporation thereof in the added floc-forming sludge from the main process. In this way, the sludge is reactivated and, together with the effluent form the BABE reactor, recycled to the activated sludge plant. Thus, the removal capacity of the activated sludge plant for the specific component(s) is enhanced. Preferably, 0.01 to 0.25 part, especially 0.05 to 0.2 part per weight per part of the sludge from the activated sludge reactor returned to the activated sludge reactor is added to the bio-augmentation reactor. Without this sludge control of the invention, the specific micro-organisms would not sufficiently survive the selection pressure by the non-specific micro-organisms in the main process.

An advantage of the process of the invention is that the sludge retention time in the pre-treatment (bioaugmentation) reactor can be controlled independently from the hydraulic retention time, by separating sludge from the reactor effluent continuously or, preferably, discontinuously, and retaining part of the sludge in the reactor. As a result, the hydraulic retention time can be much shorter than the sludge retention time, and thus the reactor dimensions can be reduced and the productivity of the reactor increased.

The part of the sludge that is retained is preferably between 10 and 90 wt. % of the total sludge content of the reactor, especially between 20 and 80 wt. %. The sludge retention time in the pre-treatment reactor is usually between 1 and 5 days and the hydraulic retention time is generally less than 2 days, especially from 2 h to 12 h, depending on the nature of the specific component and of the micro-organism which converts the specific component. The sludge concentration in the pre-treatment reactor is generally between 1 and 30 g/l.

The specific component to be treated can be any organic or inorganic component, which requires particular organisms to be degraded or which are xenobiotic or inhibitory chemicals not sufficiently degraded in a normal activated sludge plant. Examples are organic substances like phenolic compounds, organic nitrogen compounds such as aromatic amines, especially phenylenediamines, organohalogen compounds and inorganic substances, such as thiocyanate and especially ammonia. Degradation of thiocyanate can take place by bacteria of the genus Thiobacillus, while phenol can be removed by Pseudomonas bacteria. Ammonia is degraded by nitrifying bacteria including the genus Nitrosomonas. Breakdown of o-phenylenediamine in a conventional nitrifying sludge system by yet unidentified, but commonly available, species was confirmed.

The bacteria capable of specifically converting these components are usually present in normal waste water treatment sludge, and will grow and become sufficiently active in the pre-treatment reactor as a result of the higher relative concentration of the specific component. For this purpose, it is important that the level of non-specific COD in the pre-treatment (bioaugmentation) reactor is lower than in the main reactor, while the level of specific component(s) is higher than in the main reactor. In particular, the level of non-specific COD in the pre-treatment reactor is less than 10 times, preferably less than 5 times (w/w), the concentration of the specific component. Alternatively, the ratio of specific component to non-specific COD in the pre-treatment reactor should be at least 5 times higher than the same ratio in the main reactor. As a result, the amount of specific biomass is increased and a large fraction of the specific component is removed prior to the final treatment in the conventional system. The process of the invention is further illustrated below with reference to ammonia as the specific component, but the process can suitably be performed in a similar manner with other specific components.

According to a preferred embodiment of the invention, reject water (water originating from sludge dewatering) or any other waste water with at least 150 mg/l, especially at least 200 mg/l of ammonia and no or a limited amount of COD, together with a limited flow of return sludge from the main process, is intermittently fed to a discontinuously operated pre-treatment reactor. The sludge retention time of the nitrifying bacteria is 1–2 days. After feeding and reacting (aerated, anoxic or combined aerobic/anoxic) for a given period of time, the sludge mixture inside the reactor is allowed to settle. After settling a volume equal to the feed volume is discharged to the existing biological treatment. In this way the surplus sludge is discharged together with the effluent.

This mode of operation has the following advantages:
by applying the settling phase the sludge retention time is no longer coupled with the hydraulic retention time;
the use of the return sludge ensures incorporation of the nitrifying sludge in the flocs, thus enhancing the nitrification capacity of the activated sludge reactor, and preventing the preferential "grazing" by higher organisms of nitrifiers;
a faction of the added return sludge is partly digested, thus applying a "cost-free" carbon source for denitrification.

In the process according to the invention, the pre-treatment reactor may be operated in the aerated (nitrification) mode only. Advantageously, however, it is periodically operated in an anoxic mode, by interrupting the oxygen supply. As a result, nitrite and/or nitrate that has accumulated in the reactor is endogenously denitrified to produce molecular nitrogen. An electron donor, such as an alcohol or other organic substance, may be added during the anoxic phase. It is also possible, during the anoxic periods, to continue the addition of ammonia-containing water, resulting in oxidation of ammonia using nitrite and/or nitrate as oxygen source according to the reaction: $NH_4^+ + NO_2^- \rightarrow N_2 + 2H_2O$. This process is also referred to as the "Anammox" process (cf. WO 98/07664).

The ammonium-containing waste water, containing little or no COD, can originate from an autonomous source, such as industrial or agricultural (e.g. pig breeding) waste streams. It may also be the reject water of a sludge dewatering plant used downstream of the activated sludge reactor. The reject water may be introduced as such, or together with part of the sludge.

The temperature in the pre-treatment reactor is preferably in the range of 20–45° C. More preferably, it is between 30 and 40° C., in case optimum nitrification is the goal of the process. The reactor temperature can be controlled by the ratio of influent to return sludge fed into the pre-treatment reactor. By maintaining an elevated temperature in the pre-treatment reactor, while the temperature in the activated sludge reactor is at the usual level of 8–20° C., an effective overall degradation of COD and removal of specific component (ammonia) is achieved.

FIG. 1 shows the typical configuration of the process. Herein a pre-treatment reactor 1 is fed with water containing ammonia, or containing another specific component, through line 2, and is continuously or periodically aerated through air supply 3. An optional buffer tank 7 may be used to accommodate a continuous feed of influent to be supplied to the pre-treatment (BABE) reactor which operates batchwise. An optional settler 4, which may or may not be integrated with the reactor, can be used to return part of the sludge to the pre-treatment reactor. The effluent and part of the sludge from the pre-treatment reactor are fed to activated sludge plant 8 through 5 and 6, respectively, or in a single flow (not shown). Waste water containing COD, which may also contain the specific component, is fed through line 9. The effluent from the activated sludge reactor 8 is discharged through line 10 and is clarified in settler 11. Treated waste water is carried off through line 12, and the sludge is returned to the activated sludge plant 8 through 13 and, optionally, partly to the pre-treatment reactor 1 through 14.

With respect to the (COD) waste water input (Qi) through 9, the flow of the sludge returned through 13 may be between 0.2 and 2 times Qi. The input of influent containing ammonium (or containing another specific component) through 2 may be between 0.01 and 0.2 times Qi, while the flow of the sludge returned to the pre-treatment reactor through 14 may be between 0.1 and 2 times the flow in 2.

EXAMPLE

A pilot unit according to FIG. 1 was used consisting of a batch reactor (BABE reactor) 1 with a volume of 25 l, and a continuous reactor 8 (main process) with a volume of 250 l. The main process was performed in a carrousel-type reactor with a MLSS (mixed liquor suspended solids) level of 3 g (dry substance) per l, treating municipal waste water at a flow of 2.2 m³/day. The COD influent concentration was on average 500 mg/l, while the $N_{kj}$ concentration was 45 mg/l. The temperature varied between 13 and 17° C. The sludge age was maintained at 2.5 days. Under these conditions, nitrification is not possible.

The batch reactor was fed twice a day with a batch of 17 l of synthetic waste water containing 1000 mg $NH_4$-nitrogen per l, together with 1,7 l of return sludge from the main process. After inoculation with nitrifying sludge from a common activated sludge plant, the BABE reactor rapidly started to nitrify the added ammonia, with an efficiency of approx. 90%. The predominant nitrification product was nitrite. The regular addition of nitrifying biomass from the BABE reactor to the main process allowed the main process to achieve full nitrification within 10 days. The nitrification was complete to nitrate.

Disconnecting the discharge of the surplus sludge from the BABE reactor to the main process rapidly reduced the nitrification in the main process, while the nitrification in the BABE reactor remained constant. FIG. 2 shows the measured ammonia removal efficiencies for both units with and without coupling.

What is claimed is:

1. A process for the combined biological treatment of waste water containing one or more specific components and waste water containing non-specific COD and lower concentrations of the specific component, comprising the steps of:
   a) treating the waste water containing the non-specific COD in an activated sludge reactor;
   b) pretreating the waste water containing the one or more specific components in an aerated, bioaugmentation reactor to produce an effluent;
   c) feeding the effluent from the bioaugmentation reactor to the activated sludge reactor;
   d) feeding a part of the sludge from the activated sludge reactor to the bioaugmentation reactor, said part being 1 to 25 weight percent of the amount of the sludge from the activated sludge reactor returned to the activated sludge reactor; and
   e) feeding a part of the sludge from the bioaugmentation reactor to the activated sludge reactor.

2. A process according to claim 1, comprising applying a hydraulic retention time in the bioaugmentation reactor which is shorter than the sludge retention time.

3. A process according to claim 1, wherein the bioaugmentation reactor is periodically operated in an anoxic mode.

4. A process according to claim 1, wherein the bioaugmentation reactor is operated discontinuously, comprising the reactor stages of;
   (a) adding the waste water containing the specific component, together with part of the sludge from the activated sludge reactor,
   (b) reacting the waste water with the sludge to partially remove the specific component and simultaneously grow adapted biomass,
   (c) allowing the sludge to settle,
   (d) discharging at least a part of the treated waste water and a part of the sludge from the reactor to the activated sludge reactor.

5. A process according to claim 1, wherein the specific component is ammonia and a sludge retention time in the augmentation reactor is applied which favours nitrite-producing bacteria over nitrate-producing bacteria.

6. A process according to claim 5, wherein the sludge retention time is between 1 and 2 days and the hydraulic retention time is less than 1 day.

7. A process according to claim 6, wherein the hydraulic retention time is from 2 hours to 12 hours.

8. A process according to claim 5, wherein the ammonia-containing waste water contains at least 150 mg ammonia per liter.

9. A process according to claim 5, wherein the ammonia-containing waste water originates from a dewatering of sludge separated from the activated sludge reactor.

10. A process according to claim 1, wherein said bioaugmentation reactor has a process temperature and wherein the process temperature in the bioaugmentation reactor is controlled by the ratio of waste water containing the specific component fed to the bioaugmentation reactor to the amount of the sludge fed from the activated sludge reactor to the bioaugmentation reactor.

11. A process according to claim 1, wherein the sludge fed from the activated sludge reactor to the bioaugmentation reactor is thickened surplus sludge from the activated sludge reactor.

12. A process according to claim 1, wherein an amount of 5 to 20 weight percent of the amount of sludge from the activated sludge reactor returned to the activated sludge reactor is fed to the bioaugmentation reactor.

* * * * *